(12) United States Patent
Kurata

(10) Patent No.: US 10,741,082 B2
(45) Date of Patent: Aug. 11, 2020

(54) DRIVING ASSISTANCE DEVICE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 324 days.

(21) Appl. No.: 15/847,226

(22) Filed: Dec. 19, 2017

(65) Prior Publication Data

US 2018/0197415 A1 Jul. 12, 2018

(30) Foreign Application Priority Data

Jan. 11, 2017 (JP) ................................. 2017-002821

(51) Int. Cl.
*G08G 1/16* (2006.01)
*B60K 35/00* (2006.01)
(Continued)

(52) U.S. Cl.
CPC ............ *G08G 1/166* (2013.01); *B60K 35/00* (2013.01); *B60R 1/00* (2013.01); *B60W 50/14* (2013.01);
(Continued)

(58) Field of Classification Search
CPC ...... G08G 1/166; G08G 1/0962; G08G 1/168; B60K 35/00; B60K 2370/152;
(Continued)

(56) References Cited

U.S. PATENT DOCUMENTS

| 3,868,629 A | * | 2/1975 | Caine ..................... B60Q 1/525 340/435 |
| 2007/0154068 A1 | * | 7/2007 | Stein ........................ G01C 3/22 382/106 |

(Continued)

FOREIGN PATENT DOCUMENTS

| JP | 2006-205773 A | 8/2006 |
| JP | 2006-293531 A | 10/2006 |
| JP | 2009-157466 A | 7/2009 |

OTHER PUBLICATIONS

Information Offer Form dated Nov. 25, 2019, issued by the Japanese Patent Office in corresponding application JP 2017-002821.
(Continued)

*Primary Examiner* — Courtney D Heinle
(74) *Attorney, Agent, or Firm* — Stein IP, LLC

(57) ABSTRACT

There is provided a driving assistance device. An imaging unit is configured to acquire an image of another vehicle running behind one vehicle which is equipped with the driving assistance device. A tailgating determining unit is configured to determine whether the another vehicle is tailgating the one vehicle on the basis of the image acquired by the imaging unit. A continuity determining unit is configured to determine whether tailgating determined by the tailgating determining unit has been performed continuously. An information providing unit configured to provide a driver of the one vehicle with information on the another vehicle, if the continuity determining unit determines that the tailgating has been performed continuously.

12 Claims, 8 Drawing Sheets

(51) Int. Cl.
*B60R 1/00* (2006.01)
*B60W 50/14* (2020.01)
*G06K 9/00* (2006.01)
*G08G 1/0962* (2006.01)

(52) U.S. Cl.
CPC ....... *G06K 9/00805* (2013.01); *G08G 1/0962* (2013.01); *B60K 2370/152* (2019.05); *B60K 2370/176* (2019.05); *B60K 2370/178* (2019.05); *B60K 2370/179* (2019.05); *B60K 2370/193* (2019.05); *B60K 2370/21* (2019.05); *B60R 2300/8066* (2013.01); *G08G 1/168* (2013.01)

(58) Field of Classification Search
CPC ........ B60K 2370/178; B60K 2370/176; B60K 2370/193; B60K 2370/21; B60K 2370/179; B60R 1/00; B60R 2300/8066; B60W 50/14; G06K 9/00805
See application file for complete search history.

(56) References Cited

U.S. PATENT DOCUMENTS

| | | | | |
|---|---|---|---|---|
| 2007/0159311 | A1* | 7/2007 | Schober | B60Q 1/525 340/435 |
| 2009/0265061 | A1* | 10/2009 | Watanabe | G08G 1/165 701/36 |
| 2012/0287276 | A1* | 11/2012 | Dwivedi | G06K 9/00825 348/148 |
| 2013/0057397 | A1* | 3/2013 | Cutler | B62D 15/0255 340/435 |
| 2013/0187771 | A1* | 7/2013 | Rothschild | B60Q 9/008 340/435 |
| 2015/0307025 | A1* | 10/2015 | Hedley | B60Q 1/30 701/36 |
| 2016/0101729 | A1* | 4/2016 | Burke | B60W 50/14 701/36 |
| 2016/0351055 | A1* | 12/2016 | Seid | B60Q 1/503 |
| 2017/0186320 | A1* | 6/2017 | Lai | G08G 1/096716 |
| 2017/0263128 | A1* | 9/2017 | Chandran | G06T 7/50 |
| 2017/0369055 | A1* | 12/2017 | Saigusa | G08G 1/161 |
| 2018/0005503 | A1* | 1/2018 | Kaindl | G08G 1/166 |
| 2018/0025636 | A1* | 1/2018 | Boykin | G08B 13/19656 701/1 |

OTHER PUBLICATIONS

Notice of Submission of Publications dated Dec. 17, 2019, issued by the Japanese Patent Office in corresponding application JP 2017-002821.

* cited by examiner

DRIVING ASSISTANCE DEVICE

CROSS-REFERENCE TO RELATED APPLICATIONS

The disclosure of Japanese Patent Application No. 2017-002821 filed on Jan. 11, 2017, including specification, drawings and claims is incorporated herein by reference in its entirety.

TECHNICAL FIELD

The present invention relates to a driving assistance device.

BACKGROUND

When a vehicle (hereinafter, also referred to as a preceding vehicle) runs, if the driver of another vehicle (hereinafter, also referred to as a following vehicle) running behind the preceding vehicle feels that a driving state which the driver wants is obstructed by the preceding vehicle, the following vehicle may tailgate the preceding vehicle (e.g. drive too closely behind the preceding vehicle). Tailgating includes high-risk acts such as the act of following a preceding vehicle too closely.

In general, most of drivers whose tailgate are habitual tailgaters, and such habitual tailgaters rarely recognize that they are tailgating. However, for now, there is no means effective in giving a warning to such habitual tailgaters. Therefore, in order to prevent accidents, preventive safety centering on self-defense of drivers is important.

In the related art, when a subject vehicle is tailgated by another vehicle, in order to determine whether the tailgating vehicle is a vehicle having tailgated the subject vehicle in the past, for example, the driver of the subject vehicle needs to look in the rearview mirror or turn his head to check the following vehicle. Therefore, the burden on the driver is large.

There has been proposed a driving supporting device for determining the state of another vehicle around a subject vehicle equipped with the driving supporting device, and determining the possibility that another vehicle will tailgate the subject vehicle equipped with the driving supporting device, at least on the basis of the result of determination on the state of another vehicle, and performing notification control for the driver of the subject vehicle equipped with the driving supporting device on the basis of the result of determination on the possibility (see Patent Document 1).

In Patent Document 1, a risk notification for notifying the driver that there is a risk is performed as notification control.

Patent Document 1: Japanese Patent Application Publication No. 2006-205773A

However, the technology disclosed in Patent Document 1 just performs the risk notification for notifying the driver that there is a risk, and does not consider how the driver of the subject vehicle equipped with the driving supporting device determines whether another vehicle is driven by a habitual tailgater and how the driver of the subject vehicle equipped with the driving supporting device ensures preventive safety mainly with a focus on self-defense.

SUMMARY

It is therefore an object of at least one aspect of the embodiments of the present invention to provide a driving assistance device capable of improving preventive safety by enabling the driver of a subject vehicle equipped with the driving assistance device to take an act in self-defense, in view of whether the driver of another vehicle is a habitual tailgater.

There is provided a driving assistance device configured to be equipped in one vehicle, comprising: an imaging unit configured to acquire an image of another vehicle running behind the one vehicle which is equipped with the driving assistance device; a tailgating determining unit configured to determine whether the another vehicle is tailgating the one vehicle on the basis of the image acquired by the imaging unit; a continuity determining unit configured to determine whether tailgating determined by the tailgating determining unit has been performed continuously; and an information providing unit configured to provide a driver of the one vehicle with information on the another vehicle, if the continuity determining unit determines that the tailgating has been performed continuously.

According to the aspect of the embodiments of the present invention, the driver of the subject vehicle equipped with the driving assistance device can perform an act in self-defense in view of whether the driver of another vehicle is a habitual tailgater, thereby capable of improving preventive safety.

DETAILED DESCRIPTION OF THE EMBODIMENTS

Figure 1:
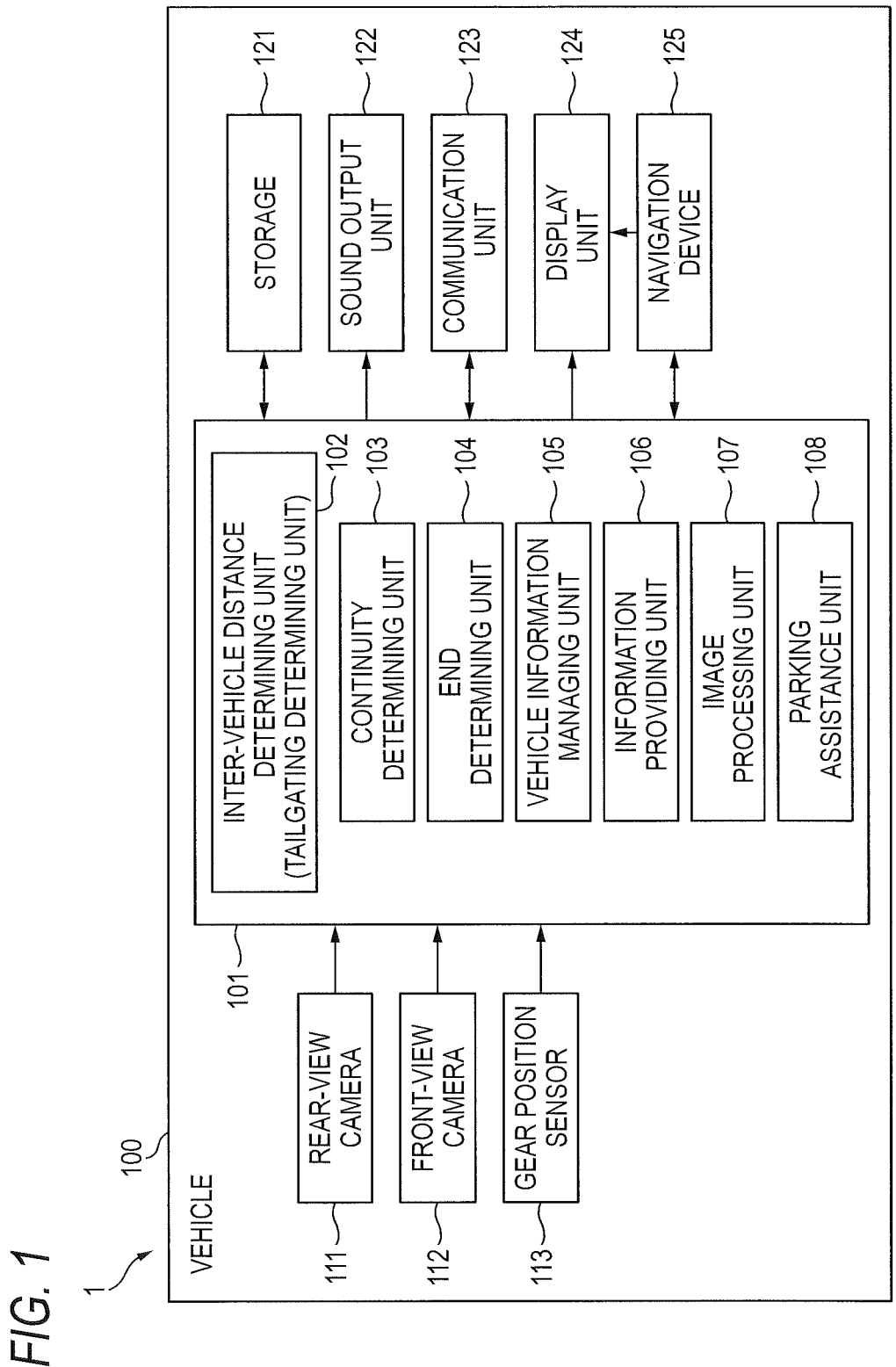
FIG. 1 is a view illustrating a rough configuration of a driving assistance device according to an embodiment.

Hereinafter, an embodiment of the present invention will be described in detail with reference to the accompanying drawings. Although a four-wheeled automobile using a driving assistance device according to the embodiment of the present invention will be described as an example, objects to which the present invention can be applied are not limited thereto, and the present invention can be applied to various objects. For example, the driving assistance device according to some embodiments of the present invention may be applied to other types of vehicles (for example, saddle-ridden type vehicles like motorcycles and motor tricycles). Hereinafter, as a representative example of saddle-ridden type vehicles, a motorcycle will be described.

<Overview>

In a case where a subject vehicle is being tailgated by a following vehicle (the following vehicle is tailgating the subject vehicle), if an adjacent lane is empty or the speed of the subject vehicle is lower than the upper speed limit, it is relatively easy to escape from tailgating. However, if the road is narrow, or the subject vehicle is running in a non-passing zone, or adjacent lanes are jammed, it is difficult to let other vehicles overtake the subject vehicle. Also, if the subject vehicle is running at a speed almost equal to threshold the upper speed limit, it is difficult to accelerate the subject vehicle to secure a sufficient distance from the following vehicle. In such cases, it is difficult to escape from tailgating.

It can also be considered to warn the following vehicle to stop tailgating by inter-vehicle communication. However, in some cases like the case where inter-vehicle communication is impossible and the case where the driver of the following vehicle ignores the warning, behavior of the driver of the subject vehicle becomes the key to accident prevention.

In general, most of drivers whose tailgate are habitual tailgaters, and such habitual tailgaters rarely recognize that they are tailgating. Therefore, preventive safety with a focus on self-defense of the driver of the subject vehicle becomes the key to accident prevention.

If the driver of the subject vehicle determines that a habitual tailgater is driving the following vehicle, it is easy to take an act in self-defense. In general, on routes (commuting routes) which people frequently use, there are not many habitual tailgaters. Therefore, the driver is required to search the driver's memory for the license plate number or exterior features of the following vehicle to determine whether the following vehicle is a vehicle which a habitual tailgater is driving. In this case, for example, the driver needs to look in the rearview mirror or turn his head to check out the following vehicle. Therefore, the burden on the driver is large.

Particularly, in the case where a saddle-ridden type vehicle is tailgated, in general, it is easy for the motorcycle to change the course to the road shoulder side such that the following vehicle can overtake. However, on a narrow road, since it is impossible to secure such a sufficient road width that other vehicles can safely overtake, the driver needs to pay attention to the situation behind the motorcycle. Therefore, the burden on the driver increases.

Also, since the driver relies on only his or her memory, it is not easy to determine whether a following vehicle is a vehicle which a habitual tailgater is driving.

Accordingly, assisting the driver of a subject vehicle in self-help efforts (performance of self-defensive driving) would improve preventive safety measures.

There is provided a driving assistance device for assisting a driver of a subject vehicle equipped with the driving assistance device in searching the driver's memory to determine whether a driver of a following vehicle is a habitual tailgater by providing the driver of the subject vehicle with information on the following vehicle if the following vehicle continuously tailgates.

In other words, there is provided a driving assistance device configured to be equipped in one vehicle, including: an imaging unit configured to acquire an image of another vehicle running behind the one vehicle equipped with the driving assistance device; a tailgating determining unit configured to determine whether the another vehicle is tailgating the one vehicle on the basis of the image acquired by the imaging unit; a continuity determining unit configured to determine whether tailgating determined by the tailgating determining unit has been performed continuously; and an information providing unit configured to provide a driver of the one vehicle with information on the another vehicle, if the continuity determining unit determines that tailgating has been performed continuously.

<Driving Assistance Device>

Hereinafter, an embodiment of the present invention will be described in detail with reference to the drawings. First, the configuration of a driving assistance device 100 according to the present embodiment will be described. FIG. 1 is a view illustrating a rough configuration of the driving assistance device according to the present embodiment. Also, it is assumed that a subject vehicle 1 to which the driving assistance device 100 is applied has the same components (such as an engine and tires) as those which four-wheeled automobiles generally have, a description thereof will not be made.

The driving assistance device 100 (see FIG. 1) according to the present embodiment includes an electronic control unit (ECU) 101 which is an example of a processing unit. The ECU 101 is configured with, for example, a processor for performing various processes.

The ECU 101 is configured to be able to execute programs as a processing unit, thereby capable of implementing an inter-vehicle distance determining unit (a tailgating determining unit) 102, a continuity determining unit 103, an end determining unit 104, a vehicle information managing unit 105, an information providing unit 106, an image processing unit 107, and a parking assistance unit 108.

Also, the driving assistance device 100 includes a rearview camera 111 which is an example of an imaging unit for acquiring an image of the area behind the subject vehicle 1, and the rear-view camera is electrically connected to the ECU 101 such that the output of the rear-view camera is input to the ECU.

Further, the driving assistance device 100 includes a front-view camera 112 which is an example of an imaging unit for acquiring an image of the area in front of the subject vehicle 1, and the front-view camera is electrically connected to the ECU 101 such that the output of the front-view camera is input to the ECU.

Furthermore, the driving assistance device 100 includes a gear position sensor 113 for determining whether the gear of the subject vehicle 1 is in reverse gear position, and the gear position sensor is electrically connected to the ECU 101 such that the output of the gear position sensor is input to the ECU.

Moreover, a storage 121, a sound output unit 122, a communication unit 123, a display unit 124, and a navigation device 125 are electrically connected to the ECU 101 such that each unit can transmit signals to the ECU and receive signals from the ECU, or each unit can perform either transmission of signals to the ECU or reception of signals from the ECU.

Also, the navigation device 125 is electrically connected to the display unit 124 and a GPS reception unit (not shown in the drawings), such that the navigation device can control the display unit 124 and receive GPS signals from the GPS reception unit.

The inter-vehicle distance determining unit 102 which is an example of a tailgating determining unit is configured to determine whether a following vehicle is tailgating, on the basis of whether the distance between the subject vehicle 1 and the following vehicle calculated from a rear view image (an acquired image) acquired by the rear-view camera 111 is shorter than a specific distance, as will be described below.

The continuity determining unit 103 is configured to measure the elapsed time from a certain point of time, for example, with the clock function of the ECU 101 (see FIG. 1), and determines that tailgating has been performed continuously, if the elapsed time exceeds a reference value t.

The end determining unit 104 is configured to determine whether the following vehicle having tailgated has overtaken the subject vehicle 1, on the basis of images acquired by the rear-view camera 111 and the front-view camera 112, and conclude that the following vehicle tailgated dangerously or determine that tailgating has ended if the following vehicle changes the course or secures a sufficient distance from the subject vehicle 1.

The vehicle information managing unit 105 is configured to store information on a following vehicle, for example, the license plate number, in the storage 121 if the end determining unit 104 determines that the following vehicle has overtaken.

The information providing unit 106 is configured to provide the driver of the subject vehicle 1 with information on a following vehicle by controlling the sound output unit 122, the communication unit 123, and the display unit 124. Details of information provision will be described below.

The image processing unit 107 is configured to perform a variety of image processing such as a process of storing images (still images or videos) acquired by the rear-view camera 111 and the front-view camera 112 in the storage 121 and a process of recognizing the license plate numbers of following vehicles and preceding vehicles included in images by analyzing the images.

The parking assistance unit 108 performs a process for displaying rear view images acquired by the rear-view camera 111 on the display unit 124 if it is determined on the basis of the output of the gear position sensor 113 that the gear is in reverse gear position. The parking assistance unit 108 is a well-known means, and thus those skilled in the art can easily understand the details thereof.

Also, in the driving assistance device 100 (FIG. 1), the storage 121 is configured with one or more storage media of a read only memory (ROM), a random access memory (RAM), and so on, depending on the use.

The sound output unit 122 is configured to output an announcement, for example, with synthetic sound from a speaker (not shown in the drawings).

The driving assistance device may include an alarm generating unit in place of the sound output unit 122. The alarm generating unit is configured to alarm the driver of the subject vehicle 1. The alarm generating unit may be configured with, for example, an alarm generator and a speaker.

An example of the communication unit 123 is a near field communication unit for performing communication with a portable information processing terminal (for example, a smart phone). As the communication unit, for example, Bluetooth (registered as a trade mark) and Wi-Fi (registered as a trade mark) can be used; however, the communication unit is not particularly limited.

Another example of the communication unit 123 is a mobile radio communication unit for accessing the Internet. As the communication unit, for example, mobile teleconference communication (such as 3G, 4G, and LTE) can be used; however, the communication unit is not particularly limited.

As the display unit 124, for example, a display included in the navigation device 125 (to be described below) may be used, or for example, an overhead display (not shown in the drawings) for projecting images onto front glass may be used.

The navigation device 125 is configured to display a map on a display (an example of the display unit 124) included in the navigation device, for example, on the basis of map data stored in a storage included in the navigation device.

The GPS reception unit (not shown in the drawings) is configured to receive GPS signals from GPS satellites and output the GPS signals to the ECU 101 and the navigation device 125.

Until now, the driving assistance device 100 mounted on a four-wheeled automobile which is the subject vehicle 1 has been described with reference to FIG. 1. However, it is also possible to mount the driving assistance device 100 on a motorcycle (an example of a saddle-ridden type vehicle) which is another example of the subject vehicle 1. The case where the driving assistance device is mounted on the motorcycle is different from the case where the driving assistance device is mounted on the four-wheeled automobile in that the driving assistance device transmits information to an external communication device (not shown in the drawings) built in driver's helmet by the communication unit 123 such that the external communication device can provide the driver with the information, for example, with sound, instead of displaying information on the display unit 124. Naturally, similarly in the case of the four-wheeled automobile, a device mounted on the motorcycle may be used.

Also, as the external communication device, a head mounted display (an example of the display unit 124) like smart glasses may be used to display information.

Also, in general, motorcycles do not need parking assistance unit, and thus have no rear-view cameras 111. However, in order to implement the embodiment of the present invention, it is necessary to provide the rear-view camera 111 to monitor the area behind the subject vehicle.

However, it goes without saying that the configuration of the driving assistance device 100 for the motorcycle may have the same configuration as that for the four-wheeled automobile. Also, in the following description, when the subject vehicle 1 is referred to, it means both of the four-wheeled automobile and the motorcycle.

Figure 2:
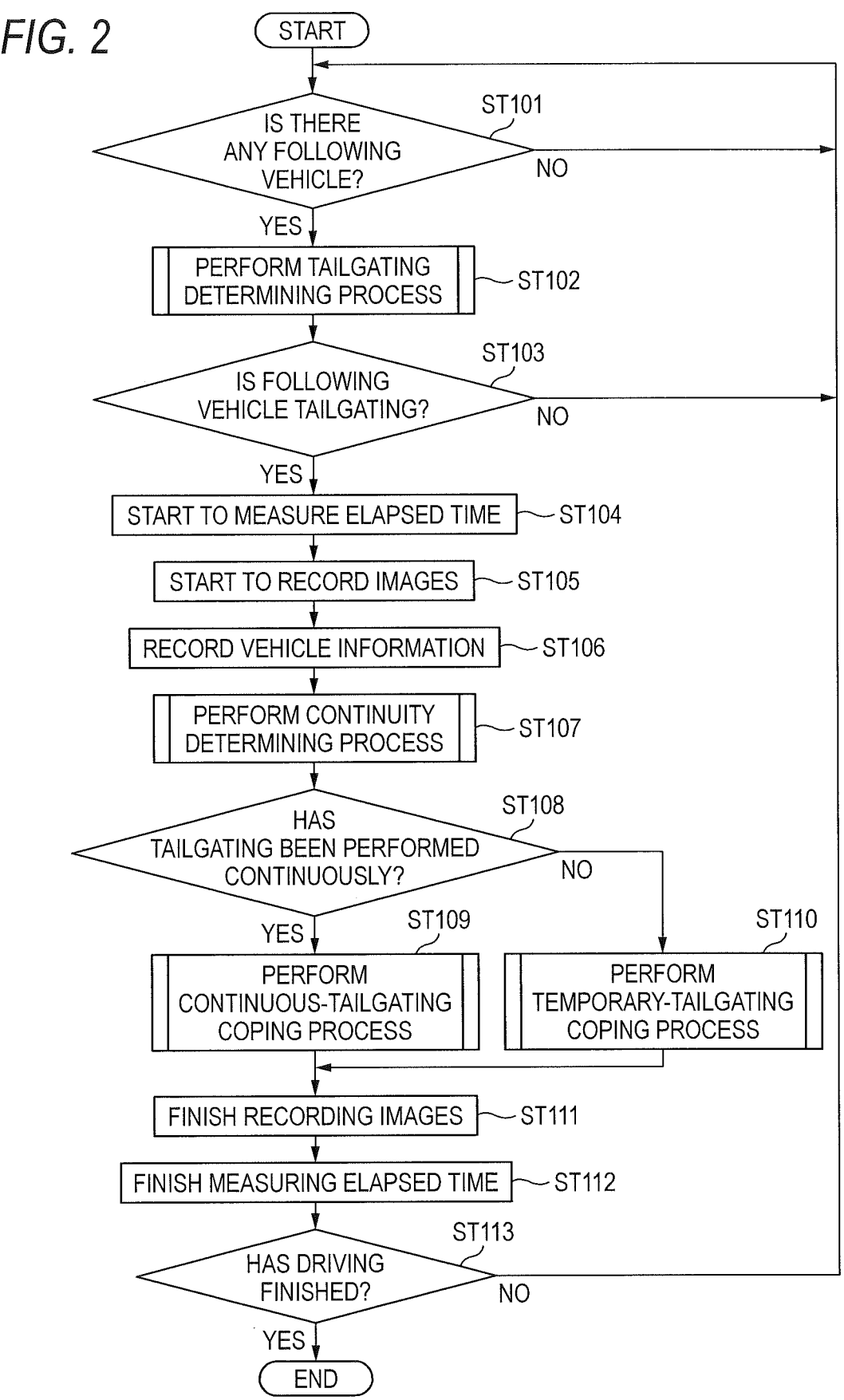
FIG. 2 is a view illustrating a control flow of the driving assistance device according to the embodiment.

Now, a control flow of the driving assistance device 100 according to the present embodiment will be described. FIG. 2 is a view illustrating the control flow of the driving assistance device 100 according to the present embodiment.

First, in STEP ST101, the inter-vehicle distance determining unit 102 (see FIG. 1) determines whether there is any other vehicle (also referred to as a following vehicle) running behind the subject vehicle 1. The inter-vehicle distance determining unit can perform such determination, for example, by determining whether an image acquired by the rear-view camera 111 includes any following vehicle.

If the determination result of STEP ST101 is "NO", the driving assistance device repeats STEP ST101.

<Tailgating Determining Process>

If the determination result of STEP ST101 is "YES", in STEP ST102, the inter-vehicle distance determining unit 102 performs a tailgating determining process.

In the present embodiment, tailgating which the inter-vehicle distance determining unit 102 detects means that a following vehicle 2 is following the subject vehicle 1 too closely.

Figure 3:
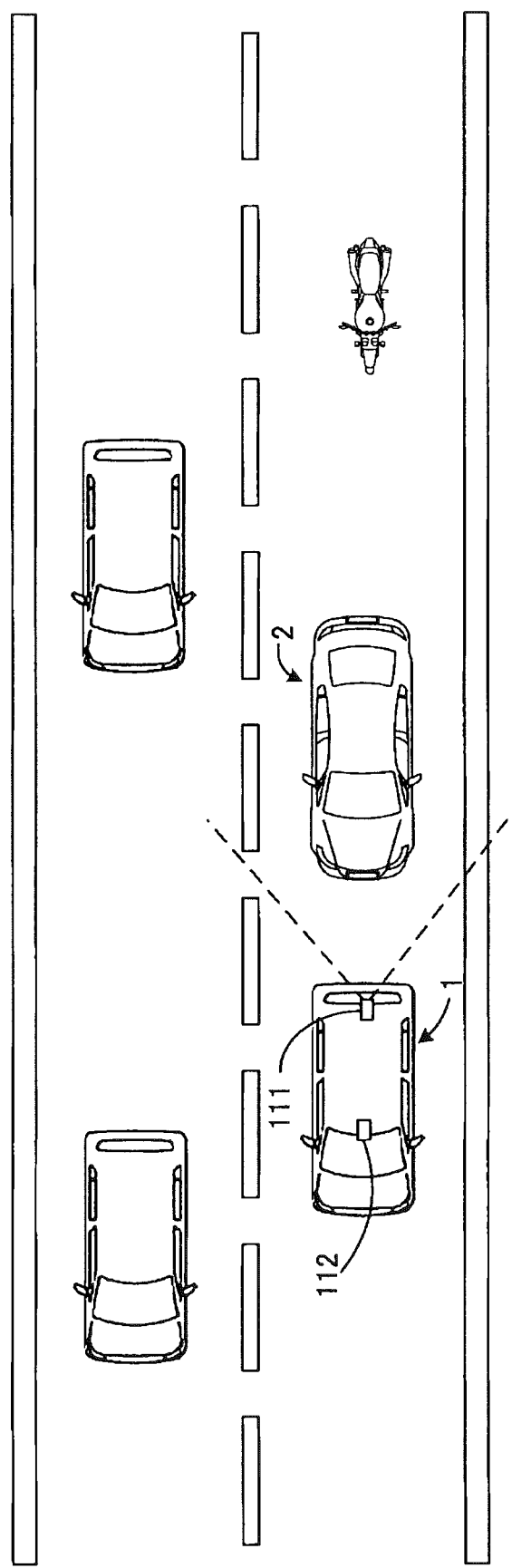
FIG. 3 is a schematic diagram illustrating the relation between a subject vehicle equipped with the driving assistance device and a following vehicle in the embodiment.
Figure 4:
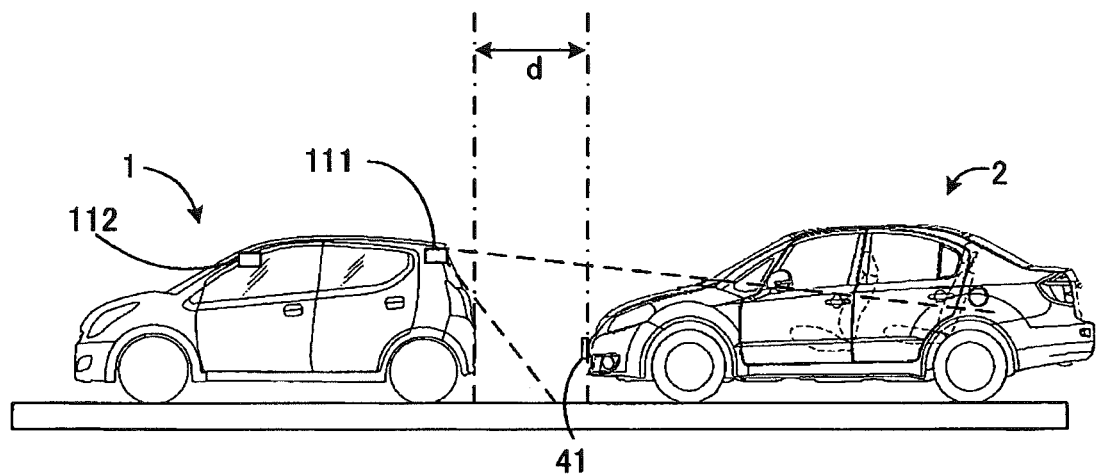
FIG. 4 is a schematic diagram illustrating the relation between the subject vehicle equipped with the driving assistance device and the following vehicle in the embodiment.

FIGS. 3 and 4 are schematic diagrams illustrating the relation between the subject vehicle 1 and the following vehicle in the present embodiment. As shown in FIGS. 3 and 4, the rear part of the subject vehicle 1 has the rear-view camera 111 to acquire an image of the area behind the subject vehicle 1 (shown by broken lines in FIGS. 3 and 4). As shown in FIGS. 3 and 4, if the following vehicle 2 approaches from behind the subject vehicle 1, the rear-view camera 111 can acquire images including the following vehicle 2, and can also acquire an image of a license plate 41 (see FIG. 4). Also, the front side of the subject vehicle 1 has the front-view camera 112 attached thereto.

Figure 5:
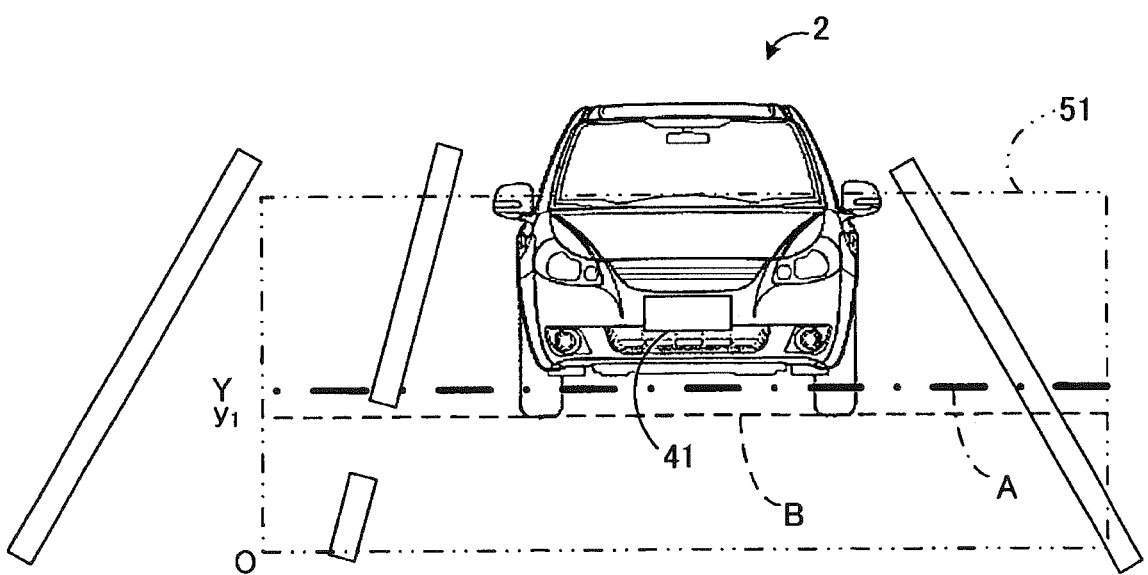
FIG. 5 is a schematic diagram illustrating the relation between the situation behind the subject vehicle equipped with the driving assistance device and a rear view image in the embodiment.

FIG. 5 is a schematic diagram illustrating the relation between the situation behind the subject vehicle 1 and a rear view image in the present embodiment. The rear-view camera 111 acquires a rear view image 51 including a part of the following vehicle 2 running behind the subject vehicle 1 (see FIG. 1) as shown in FIG. 5. The inter-vehicle distance determining unit 102 (see FIG. 1) sets a coordinate system having the lower left corner of the rear view image 51 as its origin O. Then, the inter-vehicle distance determining unit determines a value Y in the y direction corresponding to a specific distance, on the basis of values in a y direction (a vertical direction in FIG. 5) of the corresponding coordinate system and the measurement values of distances from the rear end of the subject vehicle 1, and sets a determination line A passing through the value Y and parallel to an x direction (a left-right direction in FIG. 5). Then, if a value y1 in the y direction of a virtual line B (shown by a broken line in FIG. 5) passing through the lowest end of the following vehicle 2 is smaller than the value Y of the determination line A in the y direction, i.e. if the virtual line B is closer to the origin O than the determination line A is, the inter-vehicle distance determining unit 102 determines that the inter-vehicle distanced (see FIG. 4) between the subject vehicle 1 and the following vehicle 2 is shorter than the specific distance and the following vehicle 2 is tailgating.

Here, the specific distance depends on the speed of the subject vehicle 1 and determination of the driver, and basically, the relative speed between the subject vehicle 1 and the following vehicle 2 is the main decisive factor in determining the specific distance. As an example, on general roads, a distance of about 6 meters obtained by adding a margin to the length of one normal automobile (a length of at most about 5 meters) may be used as a guide. By the way, in the case where the inter-vehicle distance is 6 meters and the relative speed is 10 km/H, it takes 2.2 seconds for both vehicles to come into contact.

Figure 6:
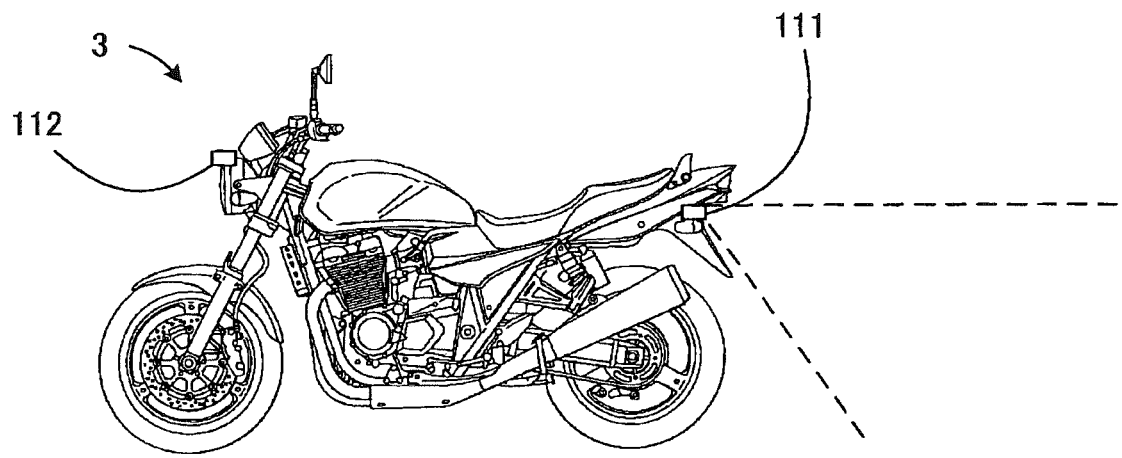
FIG. 6 is a schematic diagram illustrating a rear-view camera attachment position in the case where the subject vehicle equipped with the driving assistance device according to the embodiment is a motorcycle.

FIG. 6 is a schematic diagram illustrating a rear-view camera attachment position in the present embodiment in the case where the subject vehicle 1 is a motorcycle. As shown in FIG. 6, the rear-view camera 111 is attached to the lower side of the seat of the rear side of a motorcycle 3 such that the rear-view camera can acquire an image of the area (shown by broken line in FIG. 6) behind the motorcycle 3. Also, the front-view camera 112 is attached to the front side of the motorcycle 3. The motorcycle 3 also can determine whether any other vehicle is tailgating the motorcycle, as described above with reference to FIGS. 3 to 5.

As shown in FIG. 2, in STEP ST103, the inter-vehicle distance determining unit 102 (see FIG. 1) determines whether the following vehicle 2 (see FIG. 3) is tailgating, on the basis of the result of the tailgating determining process (STEP ST102). If the determination result of STEP ST103 is "NO", the driving assistance device returns to STEP ST101.

If the determination result of STEP ST103 is "YES", in STEP ST104, the continuity determining unit 103 starts to measure the elapsed time, using the clock function of the ECU 101.

Subsequently, in STEP ST107, the image processing unit 107 (see FIG. 1) starts to record rear view images in the storage 121. At this time, the image processing unit may continuously record images acquired by the rear-view camera 111, as a video, or may intermittently record images as sets of still images at intervals of a certain time (for example, 1 second). However, the recording mode is not particularly limited.

Subsequently, in STEP ST106, the image processing unit stores information (vehicle information) on the following vehicle 2 (see FIGS. 3 to 5) in the storage 121 (see FIG. 1). Here, the information on the following vehicle 2 is, for example, the license plate number of the following vehicle 2, an image of the license plate, and an image including the front part of the following vehicle 2 (including exterior features, such as the bonnet, the front grille, the bumper, and the front lights, helpful to specify the vehicle model, the vehicle color, and the like); however, it is not particularly limited. In the present embodiment, the license plate number of the following vehicle 2 acquired by image recognition of the image processing unit 107 is used.

Also, it is preferable to store the information on the following vehicle 2 in association with date and time, and the vehicle location information (coordinates) acquired from the navigation device 125, such that it is possible to analyze the tailgated situation.

Further, in the case where the rear-view camera 111 can enlarge an imaging range wider than that of the rear view image 51 shown in FIG. 5, the image processing unit may record an image of the driver of the following vehicle 2, and analyze more detailed information such as the facial expression of the driver of the following vehicle 2, thereby acquiring more detailed information such as information on whether the driver of the following vehicle 2 is intentionally tailgating and information on whether the risk is high.

<Continuity Determining Process>

Figure 7:
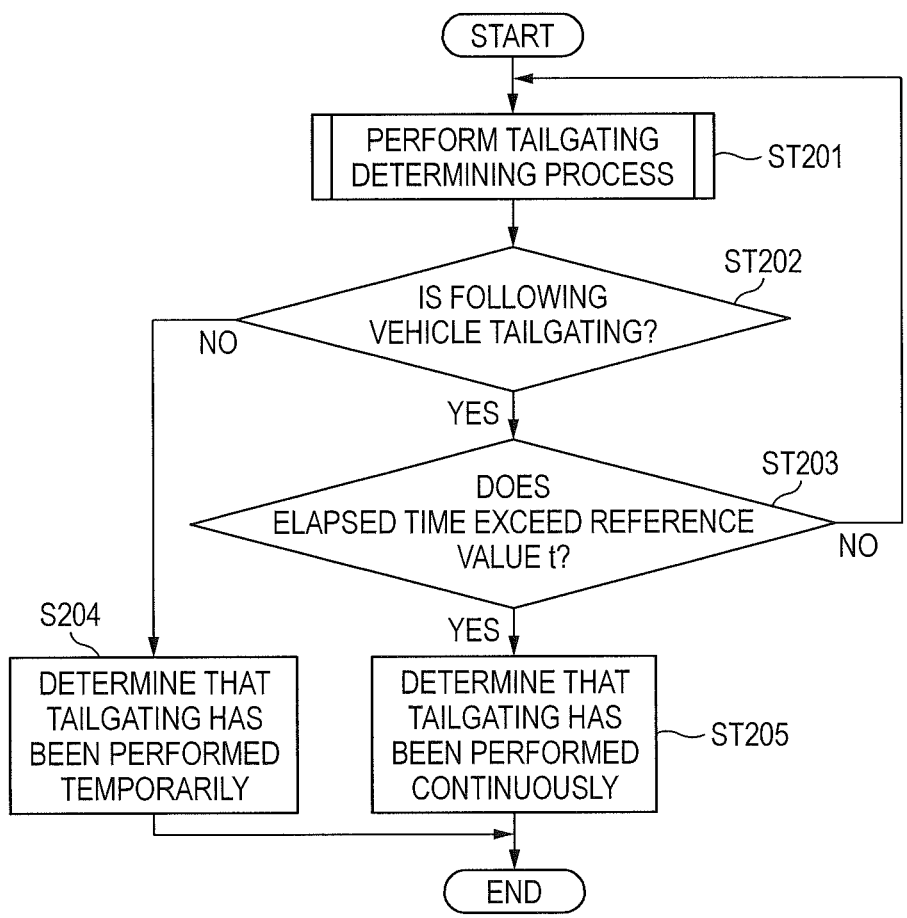
FIG. 7 is a view illustrating the flow of a continuity determining process which is performed in the driving assistance device according to the embodiment.

Subsequently, in STEP ST107, the continuity determining unit 103 determines whether tailgating has been performed continuously. FIG. 7 is a view illustrating the flow of the continuity determining process which is performed in the driving assistance device 100 according to the present embodiment. As shown in FIG. 7, first, the continuity determining unit performs a tailgating determining process (STEP ST201). The tailgating determining process is identical to STEP ST102 described with reference to FIG. 2.

In STEP ST202, the driving assistance device determines whether the following vehicle 2 (see FIG. 3) is tailgating, on the basis of the result of the tailgating determining process (STEP ST201). If the determination result of STEP ST202 is "NO", in STEP ST204, the driving assistance device determines that the elapsed time is equal to or less than the reference value t, and determines that tailgating has been performed temporarily, not continuously, and has ended. Then, the process finishes.

Meanwhile, if the determination result of STEP ST202 is "YES", in STEP ST203, the continuity determining unit (see FIG. 1) 103 determines whether the elapsed time exceeds the reference value t. If the determination result of STEP ST203 is "NO", the driving assistance device returns to STEP ST201. If the determination result of STEP ST203 is "YES", in STEP ST205, the driving assistance device determines that tailgating has been performed continuously until the elapsed time exceeds the reference value t. Then, the process finishes.

Since whether tailgating has been performed continuously or temporarily depends on driver's feeling, basically, it is preferable that the driver set the reference value t. For example, it is assumed that if the subject vehicle 1 is continuously tailgated while the subject vehicle 1 runs about 330 meters at a speed of 60 km/H, the driver feels danger and uneasy. In this case, the subject vehicle is tailgated for about 20 seconds. Therefore, as a guide, the reference value t may be set to 20 seconds.

<Continuous-Tailgating Coping Process>

Subsequently, in STEP ST108, the driving assistance device determines whether tailgating of the following vehicle 2 (see FIG. 3) has been performed continuously, on the basis of the result of the continuity determining process (STEP ST107). If the determination result of STEP ST108 is "YES", in STEP ST109, the end determining unit 104 performs a continuous-tailgating coping process. Meanwhile, if the determination result of STEP ST108 is "NO", in STEP ST110, the end determining unit performs a temporary-tailgating coping process.

Figure 8:
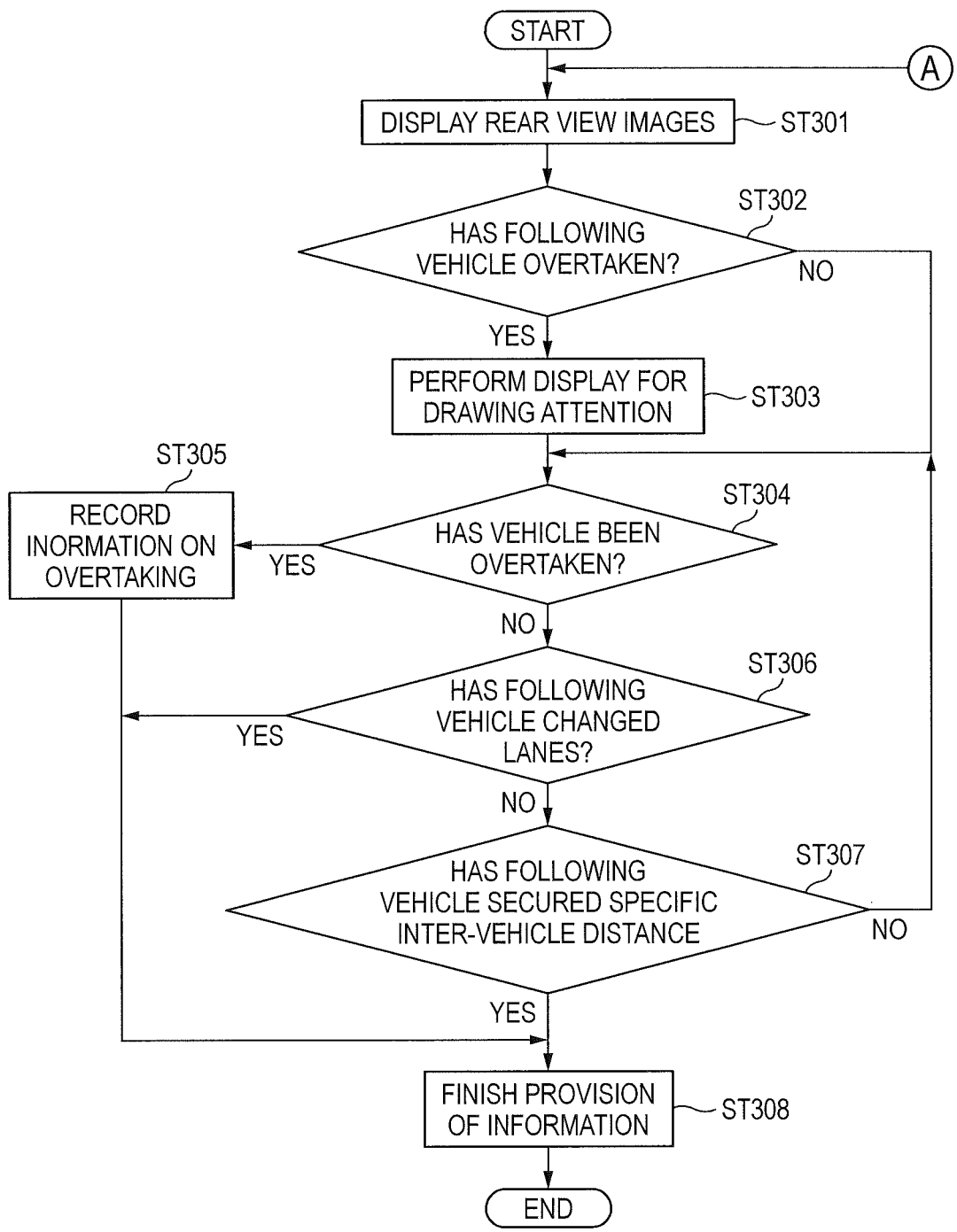
FIG. 8 is a view illustrating the flow of a continuous-tailgating coping process which is performed in the driving assistance device according to the embodiment.

FIG. 8 is a view illustrating the flow of the continuous-tailgating coping process which is performed in the driving assistance device 100 according to the present embodiment. As shown in FIG. 8, first, in STEP ST301, the information providing unit 106 controls the display unit 124 such that the display unit displays the rear view image 51 (see FIG. 5) acquired by the rear-view camera 111 and including the following vehicle 2. In this stage, the display unit may continuously reproduce images acquired by the rear-view camera 111, as a video, or may intermittently display still images at intervals of a certain time (for example, 1 second). However, the image display mode is not particularly limited.

Subsequently, in STEP ST302, with reference to information on other vehicles having tailgated the subject vehicle 1 in the past, stored in the storage 121 by the vehicle information managing unit 105, the information providing unit 106 (see FIG. 1) determines whether the following vehicle has overtaken the subject vehicle 1 in the past (to be described below), on the ON/OFF state of an overtaking flag (an example of identification information).

If the determination result of STEP ST302 is "YES", in STEP ST303, the information providing unit 106 controls the display unit 124 such that the display unit performs display for drawing the attention of the driver of the subject vehicle 1 (see FIG. 1). The information providing unit 106 may output an announcement for drawing the attention, with synthetic sound from the sound output unit 122 (see FIG. 1), instead of or while performing display for drawing the attention.

Meanwhile, if the determination result of STEP ST302 is "NO", the driving assistance device proceeds to STEP ST304, without performing STEP ST303.

In the control flow shown in FIG. 8, STEPS ST304 to ST307 are for determining whether tailgating of the following vehicle 2 (see FIG. 3 to FIG. 5) has ended. Tailgating ends if the following vehicle 2 overtakes the subject vehicle 1 (Case A), if the following vehicle 2 changes the course to a route (a road or a lane) different from that of the subject vehicle 1 (Case B), or if the following vehicle secures the specific distance from the subject vehicle 1 (Case C).

Of them, in Case A, regardless of whether tailgating has been performed continuously, it can be considered that the driver of the following vehicle 2 is a habitual tailgater and is dangerous. Therefore, in the case where tailgating ends with overtaking, the driving assistance device records an overtaking flag having an ON state in the storage 121 (see FIG. 1) in association with the license plate number which is an example of information on the following vehicle 2.

Specifically, first, in STEP ST304, the end determining unit 104 (see FIG. 1) determines whether the subject vehicle 1 has been overtaken by the following vehicle 2. The end determining unit 104 functions as an overtaking determining unit, and determines whether the following vehicle has overtaken the subject vehicle 1, in cooperation with the inter-vehicle distance determining unit 102, on the basis of rear view images acquired by the rear-view camera 111 and front view images acquired by the front-view camera 112. In other words, in the case where the following vehicle 2 (see FIG. 5) included in the rear view image 51 is not shown in the next rear view image, and a front view image includes a preceding vehicle which is the same as the following vehicle 2, the end determining unit determines that the following vehicle 2 has overtaken the subject vehicle 1. Whether the preceding vehicle is the same as the following vehicle 2 can be determined, for example, by determining whether the license plate number of the preceding vehicle recognized by the image processing unit 107 (see FIG. 7) is the same as that of the following vehicle 2.

If the determination result of STEP ST304 is "YES", in STEP ST305, the vehicle information managing unit 105 records an overtaking flag having an ON state, in the storage 121 (see FIG. 1), in association with the license plate number of the following vehicle 2. Subsequently, STEP ST303, the end determining unit 104 finishes provision of information in. Then, the driving assistance device finishes the continuous-tailgating coping process.

If the determination result of STEP ST304 is "NO", in STEP ST306, the end determining unit 104 determines whether the following vehicle has changed lanes, in cooperation with the inter-vehicle distance determining unit 102, on the basis of rear view images acquired by the rear-view camera 111 and front view images acquired by the front-view camera 112. In other words, in the case where the following vehicle 2 (see FIG. 5) included in the rear view image 51 is not shown in the next rear view image, and a front view image does not include any preceding vehicle or includes a preceding vehicle different from the following vehicle 2, the end determining unit 104 determines that the following vehicle has changed lanes. Whether the preceding vehicle is the same as the following vehicle can be determined in the above-described manner.

If the determination result of STEP ST306 is "YES", the end determining unit 104 finishes the continuous-tailgating coping process. Meanwhile, if the determination result of STEP ST306 is "NO", in STEP ST307, the end determining unit 104 determines whether the following vehicle 2 has secured the specific distance from the subject vehicle 1, in cooperation with the inter-vehicle distance determining unit 102, on the basis of rear view images acquired by the rear-view camera 111. In other words, in the case where a rear view image 51 includes the following vehicle 2 (see FIG. 5), and the virtual line B passing through the lower end of the following vehicle 2 is higher than the determination line A, the end determining unit 104 determines that the inter-vehicle distance d between the subject vehicle 1 and the following vehicle 2 is equal to or longer than the specific distance, and determines that the following vehicle 2 has secured the specific distance from the subject vehicle 1.

If the determination result of STEP ST307 is "YES", in STEP ST308, the end determining unit 104 finishes provision of information. Then, the driving assistance device finishes the continuous-tailgating coping process. Meanwhile, if the determination result of STEP ST307 is "NO", the end determining unit returns to STEP ST304, and repeats determination on whether tailgating has ended.

<Temporary-Tailgating Coping Process>

Figure 9:
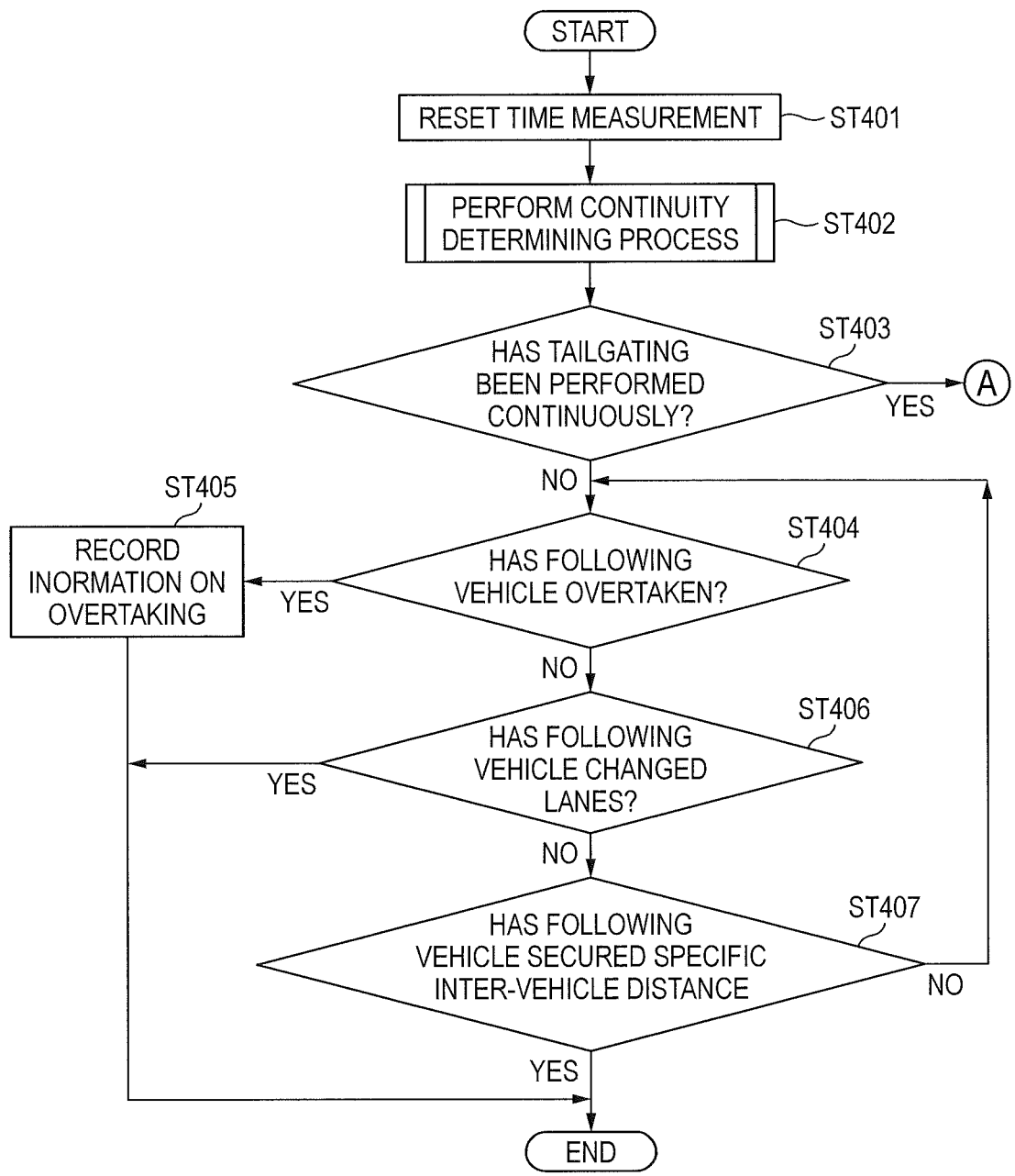
FIG. 9 is a view illustrating the flow of a temporary-tailgating coping process which is performed in the driving assistance device according to the embodiment.

FIG. 9 is a view illustrating the flow of a temporary-tailgating coping process which is performed in the driving assistance device 100 according to the present embodiment. As shown in FIG. 9, the continuity determining unit 103 (see FIG. 1) resets measurement of the elapsed time in STEP ST401, and determines whether any following vehicle is tailgating the subject vehicle 1, and determines whether tailgating has been tailgated continuously (STEPS ST402 and S403). Determination on continuity is performed in the same way as that in the case described with reference to FIG. 7. If the determination result of STEP ST403 is "YES", the driving assistance device proceeds to STEP ST301 of the continuous-tailgating coping process shown in FIG. 8, and performs the processes of STEPS ST301 to ST308.

Meanwhile, if the determination result of STEP ST403 is "NO", the driving assistance device proceeds to STEP ST404.

In the control flow shown in FIG. 9, STEPS ST404 to ST407 are for determining whether tailgating of the following vehicle 2 (see FIGS. 3 to 5) has ended, and are identical to STEPS ST304 to ST307 described with reference to FIG. 8, and a description thereof will not be made.

Figure 10:
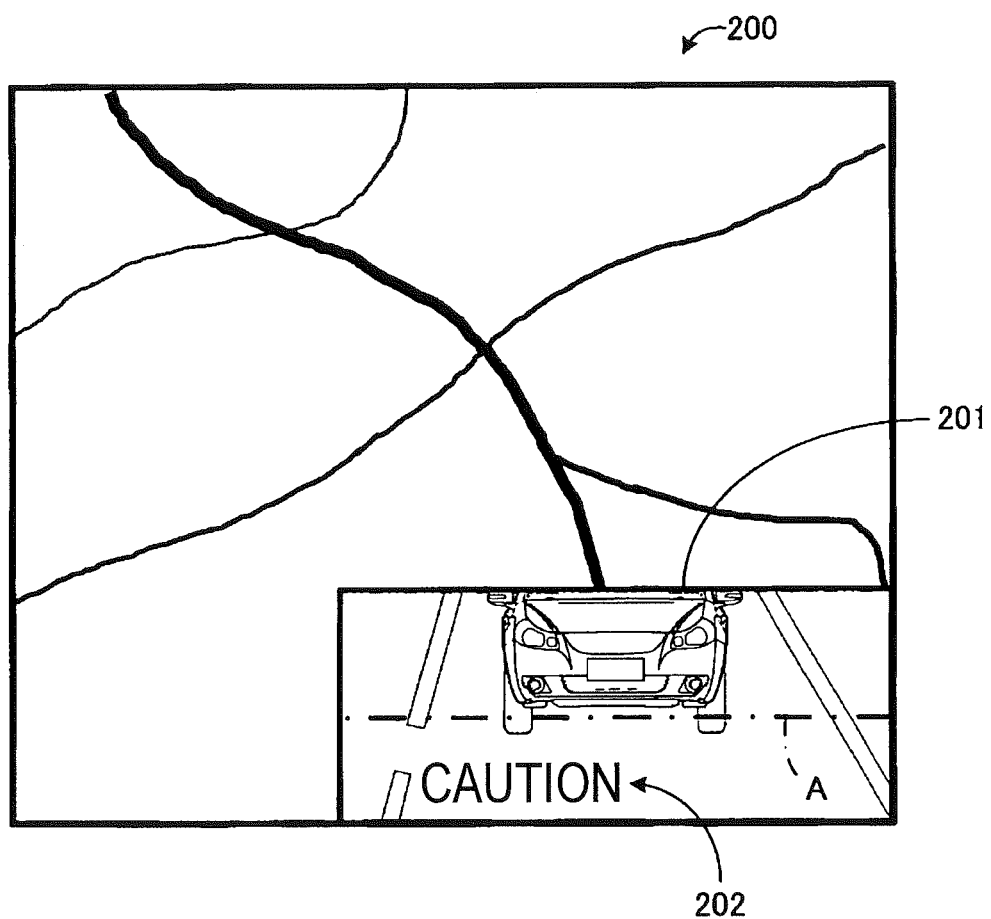
FIG. 10 is a schematic diagram illustrating an example of how the driving assistance device according to the embodiment provides a driver with information.

FIG. 10 is a schematic diagram illustrating an example of how the driving assistance device 100 according to the present embodiment provides the driver with information. FIG. 10 shows an example of how the navigation device 125 (see FIG. 1) displays an image on a display (an example of the display unit 124). As shown in FIG. 10, on a map 200 displayed by the navigation device 125, a rear view image 201 acquired by the rear-view camera 111 (see FIG. 1) and including the front part of the following vehicle 2 (see FIGS. 2 to 5) is superimposed. Further, on the rear view image 201, a text 202 for warning which is an example of attention drawing information is superimposed.

The rear view image 201 and the text 202 shown in FIG. 10 is continuously displayed until it is determined on the basis of the determination result of any one of STEP ST304 to ST307 of FIG. 8 that tailgating ends and the possibility that the following vehicle 2 (see FIGS. 3 to 5) will pose a risk is eliminated. Even though the subject vehicle 1 is a saddle-ridden type vehicle, it is impossible to easily escape from tailgating in a non-passing zone. Also, as compared to four-wheeled automobiles, saddle-ridden type vehicles are more likely to overturn due to the influence of tailgating. Therefore, it is effective in improving preventive safety to continuously provide the driver with information on a following vehicle and attention drawings information while the following vehicle is tailgating.

Referring to FIG. 2 again, if the continuous-tailgating coping process (STEP ST109) or the temporary-tailgating coping process (STEP ST110) finishes, in STEP ST111, the image synthesis unit 17 finishes recording rear view images. Also, in STEP ST112, the continuity determining unit 103 finishes measuring the elapsed time.

Next, in STEP ST1113, the ECU 101 (see FIG. 1) determines whether driving has finished, for example, on the basis of whether the engine is operating. If the determination result of STEP ST113 is "NO", the driving assistance device returns to STEP ST101. Meanwhile, if the determination result is "YES", the driving assistance device finishes the whole process.

The order of the individual processes of the control flow of the driving assistance device 100 described above is an example, and those skilled in the art can understand that it is possible to change the order.

As described above, according to the driving assistance device 100 of the present embodiment, since the driver is provided with information on the following vehicle 2 (see FIGS. 2 to 5) tailgating the subject vehicle 1 (see FIG. 1), the driver does not need to look in the rearview mirror or turn his or her head to check whether the following vehicle 2 is a vehicle which a habitual tailgater who the driver remembers is driving, and a burden is not imposed on the driver. Further, since the driver can recognize that there is a possibility that another vehicle will tailgate dangerously, on the basis of his memory, and pay attention to the corresponding vehicle, the preventive safety effect can improve.

Also, the driver can easily determine whether the following vehicle 2 is a vehicle which a habitual tailgater who the driver remembers is driving, by searching his or her memory for the license plate number or exterior features of the following vehicle 2 recognized from the rear view image 201 (see FIG. 10) including the following vehicle 2.

Also, since the driver is provided with attention drawing information, for example, the text 202 as shown in FIG. 10, the driver can easily recognize that the following vehicle 2 is tailgating.

Also, in the case where the following vehicle 2 tailgating the subject vehicle 1 has overtaken the subject vehicle 1 in the past, the possibility that the driver of the following vehicle 2 is a habitual tailgater is higher. For this reason, the driving assistance device stores the overtaking flag having the ON state in association with the license plate number of the following vehicle 2. Thereafter, when the subject vehicle 1 has been continuously tailgated by the following vehicle 2, if the storage 121 retains the overtaking flag having the ON state in association with the license plate number of the following vehicle 2, since the possibility that the following vehicle 2 will tailgate dangerously is particularly high, the driving assistance device draws attention to prevent the driver from relying on only his or her memory, thereby capable of further improving the preventive safety effect.

Also, since the inter-vehicle distance determining unit 102 (see FIG. 1) determines whether the following vehicle is tailgating, on the basis of whether the following vehicle 2 is within the specific distance from the subject vehicle 1 in the rear view image 51 (see FIG. 5) acquired by the rear-view camera 111, it is possible to determine whether the subject vehicle is being tailgated, with a simply configuration, by a simple process.

Also, in the case where the subject vehicle 1 is a saddle-ridden type vehicle, it is preferable that the information providing unit 106 (see FIG. 1) provide the driver with information through a device mounted on the saddle-ridden type vehicle or a communication device which the driver of the saddle-ridden type vehicle is wearing. In this case, although the saddle-ridden type vehicle has a configuration in which it is difficult to check the area behind the subject vehicle, it is possible to determine whether the following vehicle 2 is a vehicle which a habitual tailgater who the driver remembers is driving, without imposing a burden to the driver. In other words, since the driver does not need to look in the rearview mirror or turn his head to check the area behind the subject vehicle, and the driver can recognize that there is a possibility that any other vehicle will tailgate dangerously, on the basis of his memory, and pay attention to the corresponding vehicle, the preventive safety effect improves.

Also, in the case where the subject vehicle 1 is a four-wheeled automobile, since the rear-view camera 111 also serves as a rear view imaging unit for the parking assistance unit 108, it is possible to effectively use the rear view imaging unit for the parking assistance unit while the subject vehicle is running.

Further, in the case where the following vehicle 2 is tailgating ("YES" in the determination of STEP ST103 in FIG. 2), rear view images are recorded in the storage 121. Therefore, if tailgating causes a traffic accident and the accident is put on trial, it is possible to use the rear view images as strong evidence to prove that the subject vehicle was tailgated by the following vehicle.

Also, the present invention is not limited to the embodiment mentioned above and can be modified and implemented in various forms. With respect to the sizes, shapes, and the like of the embodiment shown in the accompanying drawings, the present invention is not limited thereto and can be appropriately modified For example, in the above-described embodiment, when the storage 121 (see FIG. 1) retains the overtaking flag having the ON state in association with the license plate number, since there is a possibility that the following vehicle 2 (see FIGS. 3 to 5) will tailgate dangerously, thereby posing a risk to the subject vehicle 1, the driving assistance device provides the driver with attention drawing information. However, in the case where the subject vehicle 1 is an autonomous vehicle, the driving assistance device may control behavior of the subject vehicle 1 instead of or while providing attention drawing information. Control on behavior of the subject vehicle 1 is specifically control on the engine to accelerate the subject vehicle, control to secure a sufficient distance from the following vehicle 2, or steering angle control to change the course to the road shoulder side or the like; however, it is not particularly limited.

In this case, if the following vehicle 2 is continuously tailgating but has not overtaken in the past, the driving assistance device does not perform behavior control. Therefore, it is not feared that excessive control on behavior may be performed, thereby hindering sooth running.

Also, in the above-described embodiment, if the end determining unit 104 which is the overtaking determining unit determines that the following vehicle tailgating the subject vehicle 1 has overtaken the subject vehicle 1 and the storage 121 retains the overtaking flag having the ON state in association with the license plate number (STEPS ST302 and ST303 of FIG. 8), the driving assistance device performs the process for drawing attention. However, in the case where the storage 121 retains the license plate number (STEP ST106 of FIG. 2), regardless of whether the overtaking flag is in the ON state, the driving assistance device may perform the same process for drawing attention. In this case, since the following vehicle 2 having tailgated in the past is highly likely to tailgate dangerously, it is possible to warn the driver not to rely on only his or her memory and to pay attention particularly to the following vehicle.

Also, in the above-described embodiment, in the case where the following vehicle 2 having tailgated overtakes the subject vehicle 1 (STEP ST305 of FIG. 8 and STEP ST405 of FIG. 9), the driving assistance device determines that the driver of the following vehicle 2 is highly likely to tailgate dangerously. Thereafter, if the following vehicle continuously tailgates, the driving assistance device performs the process for drawing attention (STEP ST303 of FIG. 8). However, the act by which it is possible to determine that the following vehicle is highly likely to tailgate dangerously is not limited to overtaking. For example, even in the case where the following vehicle 2 has turned on a blinker, has turn on high beam headlights, has passed the subject vehicle 1, or has weaved, it is possible to consider that the following vehicle is highly likely to tailgate dangerously. The driving assistance device may analyze rear view images by the image processing unit 107 (see FIG. 1), thereby recognizing such acts, and record information representing that the following vehicle has performed such acts in the storage 121 such that it is possible to use the corresponding information to determine whether it is required to draw attention, like in the case where the following vehicle has overtaken.

Also, even in the case where the following vehicle 2 has tailgated in the past while honking the horn, it is possible to consider that the following vehicle is highly likely to tailgate dangerously. For such a case, a microphone (a sound sensor) may be provided as a component other than the rear-view camera 111 (see FIG. 1). In this case, if the microphone senses the sound of the horn, the driving assistance device records information representing that the following vehicle has tailgated while honking the horn, in the storage 121, such that it is possible to use the corresponding information to determine whether it is required to draw attention, like in the case where the following vehicle has overtaken.

Like this, in determining whether it is required to draw attention, it is possible to use not only overtaking but also acts associated with a variety of tailgating, i.e. acts showing that the following vehicle is highly likely to pose a risk to the subject vehicle 1.

Also, in the above-described embodiment, in the tailgating determining process (STEP ST102 of FIG. 2), the driving assistance device determines whether the following vehicle is tailgating, on the basis of the inter-vehicle distance between the subject vehicle 1 and the following vehicle 2 (see FIGS. 3 to 5). If the following vehicle is tailgating, the driving assistance device performs the processes of STEP ST103 and the subsequent steps. However, the driving assistance device may determine whether the subject vehicle 1 can easily escape from tailgating by changing lanes, changing the course to the road shoulder side or the like, accelerating the subject vehicle, or the like, and if the determination result is "YES", the driving assistance device may returns to STEP ST101 (see FIG. 2), without performing the processes of STEP ST103 and the subsequent steps. Such determination may be performed using a well-known technology related to ITS (Intelligent Transport System) or ASV (Advanced Safety Vehicle).

Also, in the above-described embodiment, the case of comparing the determination line A and the virtual line B passing through the lower end of the following vehicle 2 as described with reference to FIGS. 3 to 5 and determining that the following vehicle 2 is tailgating has been described as an example. However, the driving assistance device may calculate the relative distance of the following vehicle 2 with respect to the subject vehicle 1, on the basis of images acquired by the rear-view camera 111 (see FIG. 1), and determine whether the following vehicle 2 is tailgating, on the basis of whether the calculated relative distance is smaller than a specific distance.

Also, in the above-described embodiment, the case of using the rear-view camera 111 and images acquired by the rear-view camera 111 which is used by the parking assistance 108 are used has been described; however, it is also possible to use images acquired by a rear-view camera which is used by a drive recorder.

Also, in the above-described embodiment, as shown in STEPS ST305 to ST307 of FIG. 8, if the following vehicle overtakes (Case A), or changes lanes (Case B), or secure a sufficient inter-vehicle distance, the driving assistance device determines that tailgating has ended. However, the present invention is not limited thereto. For example, the driving assistance device may determine that tailgating has ended, if the following vehicle 2 (see FIG. 5) in the rear view image 51 is not shown in the subsequent rear view images.

As described above, some embodiments of the present invention has the effect that the driver of the subject vehicle performs self-defense in view of whether the drivers of other vehicles are habitual tailgaters, thereby capable of improving preventive safety, and is useful, particularly, in driving assistance devices for four-wheeled automobiles, saddle-ridden type vehicles, and the like.

What is claimed is:

1. A driving assistance device configured to be equipped in one vehicle, comprising:
   a camera configured to acquire an image of another vehicle running behind the one vehicle which is equipped with the driving assistance device; and
   a processor configured to:
   determine whether the another vehicle is tailgating the one vehicle on the basis of the image acquired by the camera;
   determine whether tailgating of the another vehicle has been performed continuously;
   provide a driver of the one vehicle with information on the another vehicle, if it is determined that the tailgating has been performed continuously; and
      determine whether the tailgating of the another vehicle has ended on the basis of the image acquired by the camera; and
   a storage configured to store the information on the another vehicle therein,
   wherein the processor stores the information on the another vehicle in the storage, if the tailgating of the another vehicle has ended when the another vehicle overtakes the one vehicle, and the processor does not store the information on the another vehicle in the storage, if the tailgating of the another vehicle has ended when the another vehicle changes a route or when the another vehicle secures a specific distance from the one vehicle.

2. The driving assistance device according to claim 1, wherein the information on the another vehicle includes the image of the another vehicle acquired by the camera.

3. The driving assistance device according to claim 1, wherein the processor is configured to provide the driver with warning text or warning sound.

4. The driving assistance device according to claim 3,
   wherein the information on the another vehicle includes a license plate number, and
   wherein the processor is configured to determine whether to provide the driver with the warning text or the warning sound on the basis of the license plate number of the another vehicle stored in the storage.

5. The driving assistance device according to claim 1, wherein the processor is configured to determine whether the another vehicle is tailgating on the basis of whether the another vehicle is within a specific distance from the one vehicle in the image acquired by the camera.

6. The driving assistance device according to claim 1,
   wherein the one vehicle equipped with the driving assistance device is a saddle-ridden type vehicle, and
   wherein the processor provides the driver with the information on the another vehicle through an in-vehicle device mounted on the saddle-ridden type vehicle or a communication device which a driver of the saddle-ridden type vehicle is wearing.

7. The driving assistance device according to claim 1, wherein the one vehicle equipped with the driving assistance device is a four-wheeled automobile, and the camera is a rear view camera.

8. The driving assistance device according to claim 1,
   wherein the camera includes a front view camera and a rear view camera,
   wherein the processor is configured to determine whether the another vehicle overtakes the one vehicle on the basis of both a rear view image acquired by the rear view camera and a front view image acquired by the front view camera.

9. The driving assistance device according to claim 1, wherein when it is determined that the another vehicle is tailgating the one vehicle and the information on the another vehicle has been stored in the storage, the processor provide a driver of the one vehicle with the information on the another vehicle.

10. The driving assistance device according to claim 1, wherein when it is determined that the another vehicle is tailgating the one vehicle and the information on the another vehicle has been stored in the storage, the processor controls behavior of the one vehicle to avoid the tailgating of the another vehicle.

11. The driving assistance device according to claim 10, wherein control on the behavior of the one vehicle includes accelerating the one vehicle to secure the specific distance from the another vehicle.

12. The driving assistance device according to claim 10, wherein control on the behavior of the one vehicle includes steering to change a route of the one vehicle.

* * * * *